(12) United States Patent
Moskowitz et al.

(10) Patent No.: US 6,938,002 B2
(45) Date of Patent: Aug. 30, 2005

(54) SYSTEM AND METHOD FOR PRODUCT EVALUATION

(75) Inventors: Paul Andrew Moskowitz, Yorktown Heights, NY (US); Clifford A. Pickover, Yorktown Heights, NY (US); William Grey, Millwood, NY (US); Stephen J. Boies, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 672 days.

(21) Appl. No.: 09/885,741

(22) Filed: Jun. 20, 2001

(65) Prior Publication Data

US 2002/0198788 A1 Dec. 26, 2002

(51) Int. Cl.[7] .............................................. G06F 17/60
(52) U.S. Cl. ....................................................... 705/26
(58) Field of Search .................................. 705/26, 27

(56) References Cited

U.S. PATENT DOCUMENTS

| | | | | |
|---|---|---|---|---|
| 4,993,714 A | * | 2/1991 | Golightly | 463/17 |
| 5,950,173 A | * | 9/1999 | Perkowski | 705/26 |
| 5,978,774 A | * | 11/1999 | Rogers et al. | 705/24 |
| 6,124,583 A | | 9/2000 | Bowers | 219/714 |
| 6,418,441 B1 | * | 7/2002 | Call | 707/10 |
| 2002/0022992 A1 | * | 2/2002 | Miller et al. | 705/14 |
| 2002/0022994 A1 | * | 2/2002 | Miller et al. | 705/14 |
| 2002/0049607 A1 | * | 4/2002 | Perkowski | 705/1 |
| 2003/0004811 A1 | * | 1/2003 | Omori | 705/17 |
| 2003/0055727 A1 | * | 3/2003 | Walker et al. | 705/14 |

FOREIGN PATENT DOCUMENTS

| | | | | |
|---|---|---|---|---|
| DE | 197 08 020 C1 | * | 8/1998 | G07G/1/12 |
| EP | 84400828.4 | * | 7/1984 | G06M/3/06 |

OTHER PUBLICATIONS

No Author, "Market Research by Scanner", Business Week, May 5, 1980. Retrieved from Dialog File:15, Acc#:00115405.*
Clark, Ken "Watch this space", Chain Store Age, May 2001. Retrieved from Dialog File: 15, Acc#: 02162210.*
Radio Frequency Identification (RFID) home page, http://www.aimglobal.org/technologies/RFID/, May 15, 2001, pp. 1–2.

* cited by examiner

*Primary Examiner*—Wynn W. Coggins
*Assistant Examiner*—Naeem U. Haq
(74) *Attorney, Agent, or Firm*—Duke W. Yee; Stephen C. Kaufman; Gerald H. Glanzman (57) ABSTRACT

A method, system, and computer program product for evaluating a product is provided. In one embodiment, a product identification token associated with the product is optically scanned. The product identification token identifies a location from which a product evaluation form may be retrieved. The product evaluation form associated with the product is then retrieved using the product identification token. The product evaluation form is then presented to a user. The user may then optically scan a receipt identification token on a receipt corresponding to the purchased product. The receipt identification token provides receipt purchase information such as, for example, purchase location, purchase price, identity of the purchaser, and other demographic information. The receipt purchase information is then entered into the product evaluation form, facilitating the entry of product evaluation information about a product.

31 Claims, 5 Drawing Sheets

```
┌─────────────────────────────────────────────────────────────┐
│                        Browser                    _ □ ×    │
├─────────────────────────────────────────────────────────────┤
│ File  Edit  View  Tools  Help                               │
│ ┌──┐ ┌──┐ ┌──┐ ┌──┐                                         │
│ │Back│ │Fwd│ │Stop│ │Print│  Address: http://www.productevaluationsite.com ▼│
└─────────────────────────────────────────────────────────────┘
```

1. Where did you purchase the product? [                    ]

2. When did you purchase the product? [  ] / [  ] / [    ]
                                               MM / DD / YYYY 3. How much did you pay? $ [      ]

4. For what purpose will you use the product?
   ○ Home    ○ Office    ○ School    ○ Other 5. How did you hear about the product?
   ○ friend    ○ newspaper    ○ magazine    ○ television
   ○ Internet  ○ e-mail       ○ mail        ○ other 6. How old are you in years?
   ○ <25    ○ 25-40    ○ 41-55    ○ >55

7. What best describes your income level?
   ○ <$25,000/yr    ○ between $25,000 and $75,000/yr    ○ >$75,000

8. Are you satisfied with the product?
   ○ Yes        ○ No

9. How can we improve the product?
   [                                                    ]

SYSTEM AND METHOD FOR PRODUCT EVALUATION

BACKGROUND OF THE INVENTION

1. Technical Field

The present invention relates generally to computer software and, more particularly, to a system, method, and computer program for facilitating product evaluations.

2. Description of Related Art

Product evaluation forms and product registration forms are used almost universally by businesses to gather information from their customers in order to, for example, improve the product or direct advertising resources toward demographic audiences more receptive to purchasing the product or service offered for sale by the business. The success of these efforts depends in large part upon the percentage response the business receives to its request for information from its customers. However, these forms are tedious to complete and are often perceived by customers as mere nuisances. Thus, many customers do not take the time and effort necessary to complete these forms.

Traditionally, these forms have been physical paper forms requiring the user to fill it out with paper and then mail the form back to the business. However, a relatively recent development has changed the manner in which businesses conduct their affairs. This new development is the Internet, also referred to as an "internetwork", which is a set of computer networks, possibly dissimilar, joined together by means of gateways that handle data transfer and the conversion of messages from a protocol of the sending network to a protocol used by the receiving network. When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Further, the Internet is becoming increasingly popular as a medium for commercial transactions. This increased popularity has also resulted in the user of on-line evaluation and registration forms in efforts to increase the response to these forms and to ease the burden on customers.

However, even this improvement still requires significant effort on the part of the consumer to access the internet, locate the web site, and enter the information into the on-line form. Recently devices, such as the cuecat®, a product of Digital Convergence of Dallas, Tex., that aid users in locating web sites have been introduced into the market place. However, even these devices and systems do not adequately address the needs of businesses in securing greater response to requests for product evaluations. Therefore, it would be desirable to have a product evaluation system that facilitates data entry and encourages customers to comply with businesses requests for product evaluation and registration information.

SUMMARY OF THE INVENTION

The present invention provides a method, system, and computer program product for evaluating a product. In one embodiment, a product identification token associated with the product is optically scanned. The product identification token identifies a location from which a product evaluation form may be retrieved. The product evaluation form associated with the product is then retrieved using the product identification token. The product evaluation form is then presented to a user. The user may then optically scan a receipt identification token on a receipt corresponding to the purchased product. The receipt identification token provides receipt purchase information such as, for example, purchase location, purchase price, identity of the purchaser, and other demographic information. The receipt purchase information is then entered into the product evaluation form, facilitating the entry of product evaluation information about a product.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
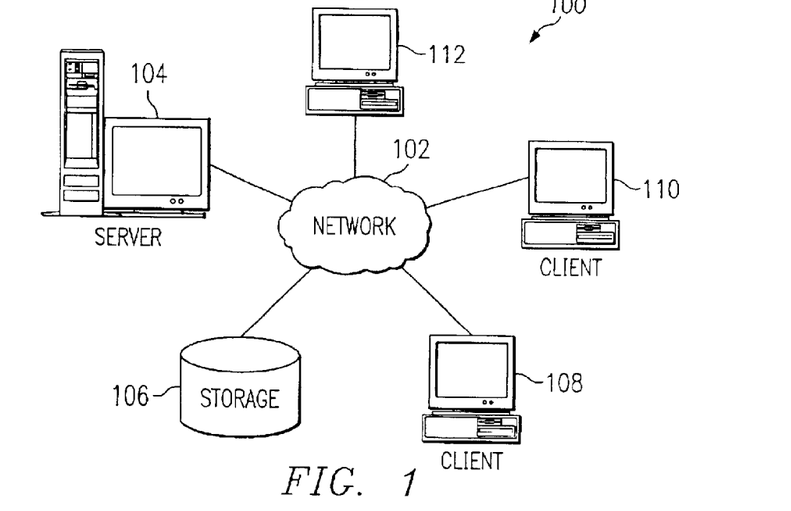
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers.

In the depicted example, server 104 provides data, such as boot files, operating system images, and applications to clients 108–112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
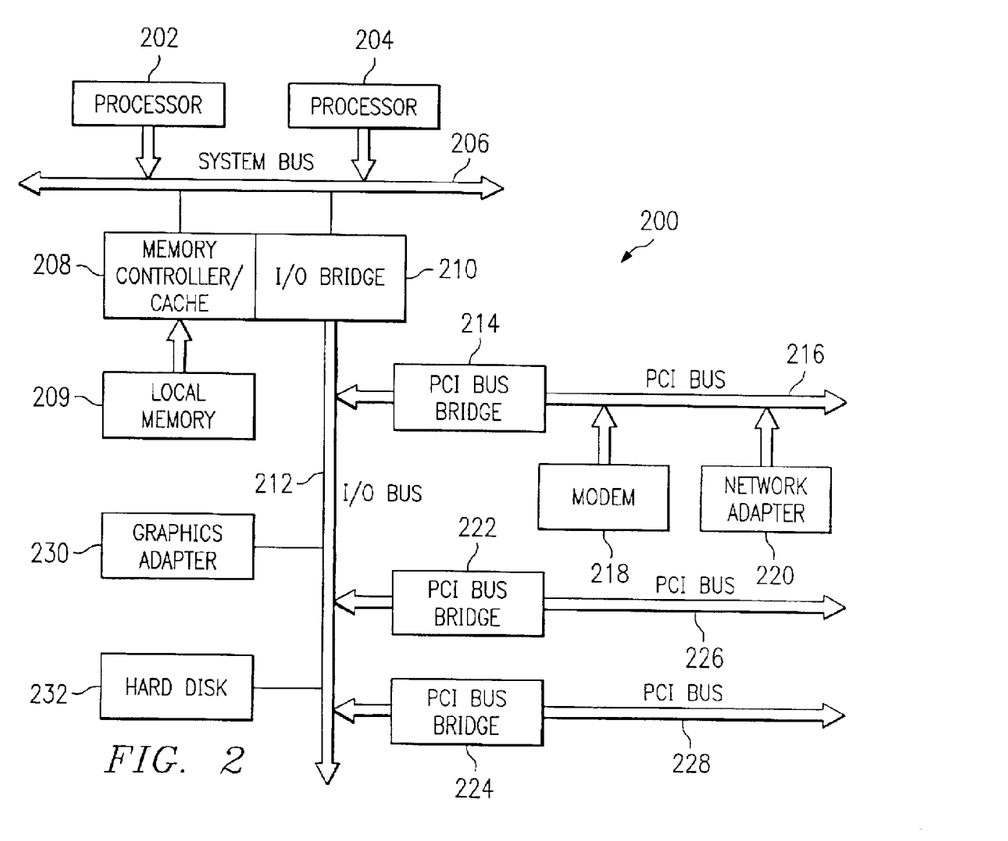
FIG. 2 depicts a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
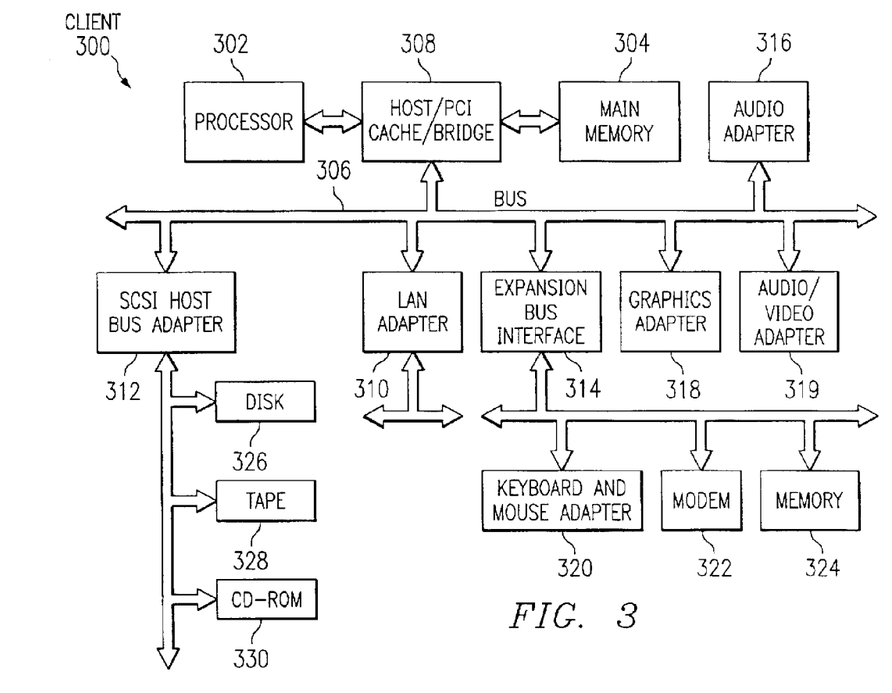
FIG. 3 depicts a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
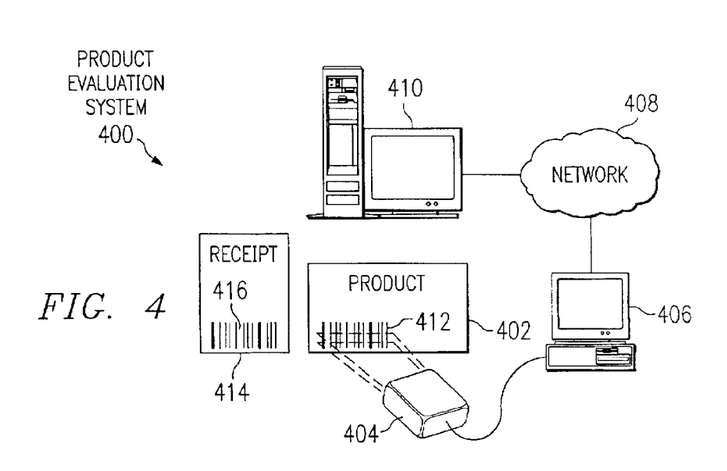
FIG. 4 depicts a pictorial diagram of a product evaluation system in accordance with the present invention.

With reference now to FIG. 4, a pictorial diagram of a product evaluation system is depicted in accordance with the present invention. In one embodiment, product evaluation system 400 includes a client computer 406 connected to a server 410 through a network 408. Client 406 maybe implemented as, for example, one of clients 108, 110, or 112 in FIG. 1, server 410 may be implemented as, for example, server 104 in FIG. 1, and network 408 may be implemented as, for example, network 102 in FIG. 1.

An automatic reading device 404, which in this embodiment is an optical scanner which is well known in the art, is connected to client 406. Reading devicer 404 is used to optically scan an identification token 412 which may be a bar code or other identifying mark from a product 402. Identification token 412 may be, for example, the universal product code (UPC) commonly found on most commercial products or it may be, for example, another of a multitude of linear or two-dimensional bar codes well known in the art. Once the product's 402 identification token 412 has been scanned, client 406 retrieves a product evaluation form from server 410, wherein the appropriate product evaluation form and the location from which it may be retrieved is identified by the identification token 412. If the identification token 412 is a UPC, then the client must translate the identity of the product into an address from which the product evaluation form may be found. alternatively, the identification token 412 may identify the address, such as, for example, a universal resource locator (URL) for a web page, from which the product evaluation form may be found. The client 406 then retrieves the appropriate product evaluation form from server 410 and presents it to a user. If network 408 is the Internet, then the product evaluation form may be a web page containing the product evaluation form.

In an alternative embodiment, the identification token 412 is a radio frequency identification tag (RFID). Such tags are well known in the art and are manufactured by the Intermec Corporation, Motorola, and Texas Instruments. For this embodiment, the reading device 404 is an RFID reader.

Figure 5:
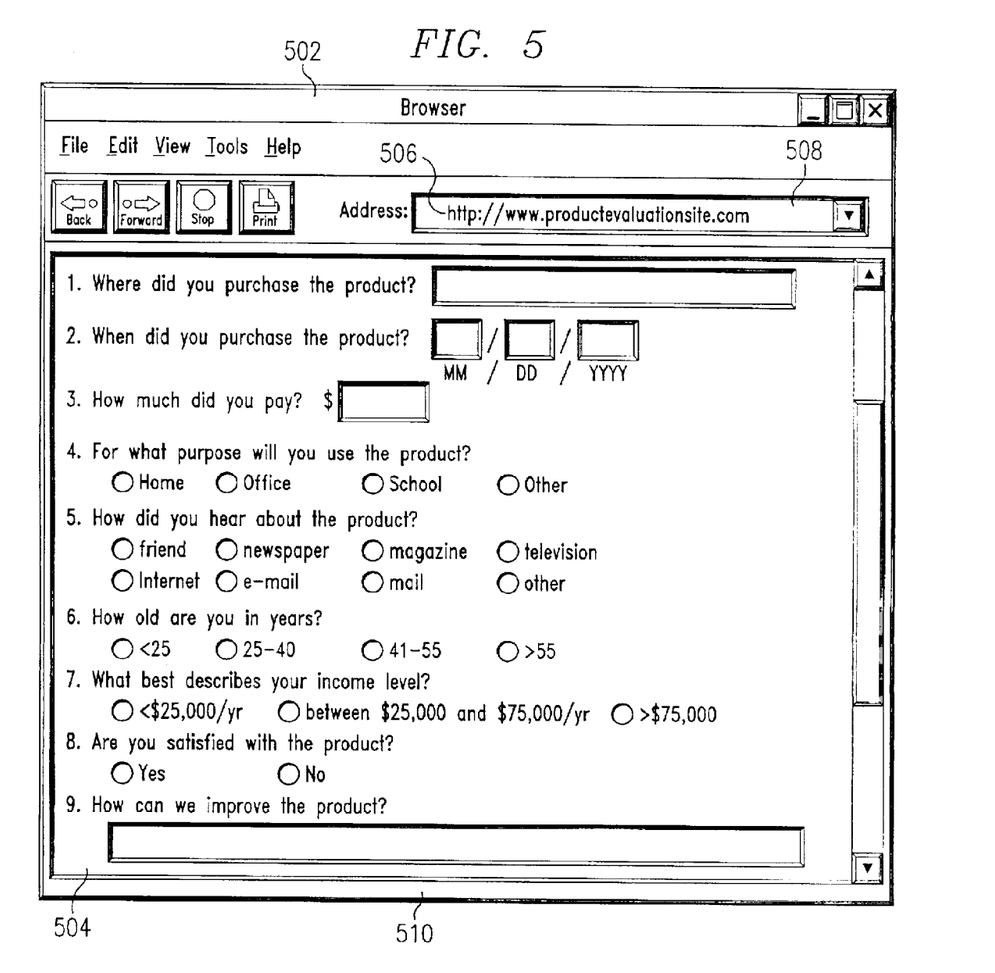
FIG. 5 depicts a pictorial diagram of a product evaluation form in accordance with the present invention.

With reference now to FIG. 5, a pictorial diagram of a product evaluation form is depicted in accordance with the present invention. In the depicted example, the product evaluation form 504 is provided by a web site and is presented to a user in the display 510 of a web browser 502. Browser 502 may be implemented on a client, such as, for example, client 406 in FIG. 4, and may be implemented as, for example, any of numerous commercially available web browsers, such as Microsoft Internet Explorer® or Netscape Navigator®. The URL 506 of the web site from which the product evaluation form 504 is provided is entered into the location bar 508 of the browser 502 by a product evaluation system on a client on which the browser is running. The product evaluation system determines the URL based upon the bar code scanned from a product. The user may then enter appropriate responses to the questions presented and send the information back to, for example, the product manufacturer.

Returning now to FIG. 4, once the product evaluation form is received by client 406, rather than have the user enter the requested information, the user may then scan a bar code 416 on a receipt corresponding to the purchase of the product 402. The bar code 416 may contain information that verifies the purchase of product 402 for a specific price as well as when product 402 was purchased and where. This information may then be automatically entered into the product evaluation form such that the user only has to enter more personal information only known by the user, such as, for example, the purpose of purchasing the product 402 and whether the user is satisfied with the product 402. If the user used a credit card, debit card, or some other means which included user identifying information, such as, for example, the name, address, and phone number of the user, to purchase the product 402, this information may also be encoded onto the bar code 416 on receipt 414. Thus, when bar code 416 is scanned by scanner 404, this information may also be entered into the product evaluation form further saving the user time in supplying product evaluation information, thereby encouraging users who would otherwise not provide product evaluation information because of the time and nuisance of doing so to provide this information. Thus, the product manufacturer or retailer will be provided with a better sampling of customer comments upon which to base future decisions regarding this or other products, thereby improving customer service.

To further entice users to provide product evaluation information, the user may be provided with a reward upon completing the product evaluation form. The reward may be for example, an electronic or physical coupon for discounts on products or services, discounts on products, cash, frequent flyer mileage, or credits towards goods or services. The reward may also be in the form of a cash rebate or non-monetary prizes. Many other examples of rewards will be obvious to one of ordinary skill in the art.

Product evaluation system 400 is provided as an example of a system for aiding and encouraging users to provide product evaluation information and is not intended to imply architectural limitations. For example, client 406 is not necessarily a desktop or laptop computer but may be implemented as, for example, a personal digital assistant (PDA), a wireless phone, or any of numerous other types of data processing systems. Furthermore, although described primarily with reference to the Internet, it is not necessary that the network be the Internet. For example, the network could be a local area network and client 406 be implemented as, for example, a kiosk inside a retail establishment. Furthermore, it is not even necessary that a network be employed at all. For example, if the system is implemented within a kiosk in a retail establishment, the scanner and database of product evaluation forms may be incorporated within the kiosk. Also, it should be noted that the product evaluation form may be instead a product registration form or any other type of interactive electronic form.

Figure 6:
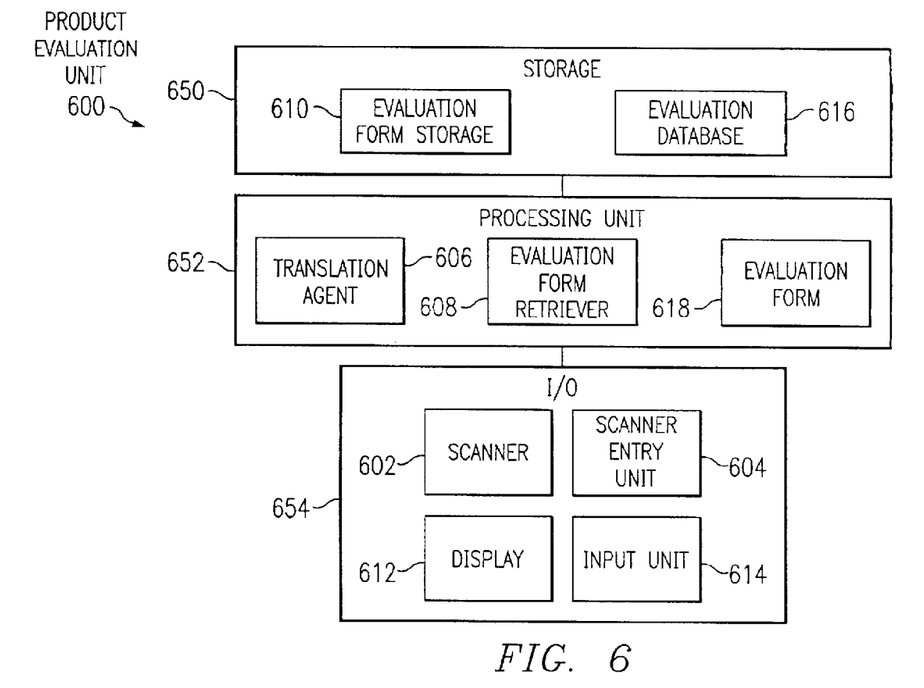
FIG. 6 depicts a block diagram of a product evaluation system in accordance with the present invention.

With reference now to FIG. 6, a block diagram of a product evaluation system is depicted in accordance with the present invention. Product evaluation system 600 includes storage unit 650, processor unit 652, and input/output (I/O) unit 654. I/O unit 654 includes a scanner 602, scanner entry unitr 604, display 612, and input unit 614. Processing unit 652 includes translation agent 606, evaluation form retriever 608, and evaluation form 618. Storage unit 650 includes evaluation form storage 610 and evaluation database 616. Product evaluation system 600 may be implemented as, for example, product evaluation system 400 in FIG. 4. Scanner 602 may be implemented as, for example, any of many commercially available optical scanners that are well known in the art.

Once a code identifying a location from which an interactive form, such as, a product evaluation form, is scanned by scanner 602, the information is sent to translation agent 606. If the code is a UPC code, then translation agent 606 retrieves a location identifier, such as, for example, a URL, associated with the scanned UPC code and passes the location identifier to the evaluation form retriever 608. If the code directly identifies a location from which the form may be located, then the translation agent 606 merely passes this along to the evaluation form retriever 608.

Evaluation form retriever 608 uses the URL or other location identifier to retrieve the evaluation form from evaluation form storage 610. Evaluation form storage 610 may be a web site or maybe a database containing numerous evaluation forms for various products and/or services. Once received, the evaluation form retriever 608 sends the evaluation form 618 to display 612 for presentation to a user.

The user may then enter the information requested in evaluation form 618 through input unit 614. Once entered, the information may be sent to an evaluation database 616 where it may be used by the product manufacturer, distributor, or other entity for its own purposes. Alternatively, once the evaluation form 618 is displayed, the user may then scan a bar code from a receipt using scanner 602. The information received by scanner entry unit 604 from the receipts scanned code may then be entered into evaluation form 618 automatically. Such information may include, for example, the location (e.g. store name and/or city and zip code) where the product was purchased, the purchase price, and the name and address of the purchaser.

Those of ordinary skill in the art will appreciate that the hardware depicted in FIG. 6 may vary. The depicted example is not meant to imply architectural limitations with respect to the present invention.

Figure 7:
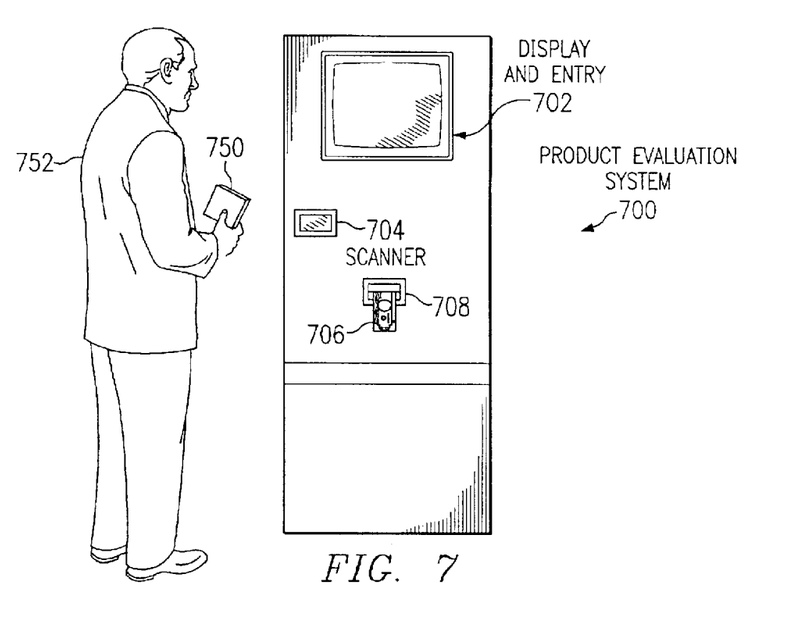
FIG. 7 depicts a pictorial diagram illustrating a product evaluation system with reward dispenser in accordance with the present invention.

With reference now to FIG. 7, a pictorial diagram illustrating a product evaluation system with reward dispenser is depicted in accordance with the present invention. Product evaluation system 700 includes a scanner 704, display and entry 702, and reward dispenser 708. Product evaluation system 700 may be implemented as, for example, a kiosk in a retail establishment or at any other point of sale, such as, for example, a restaurant or movie theater or at a point of use, such as, for example in or near a vending machine or at an amusement park. A user 752, upon purchasing a product 750 may take the product 750 to the product evaluation system 700 and scan a bar code or other optical code from product 750 into system 700 using scanner 704. The user 752 is then presented with a product evaluation form on display and entry 702, wherein the product evaluation form corresponds to the product 750 scanned by scanner 704 and may have been retrieved from a database or from a web site. The user may then enter requested information into display and entry 702 or, alternatively, may scan a code from a receipt which contains some of the requested information in the evaluation form. The information obtained from the scanned receipt is then entered into the evaluation form, thereby reducing the amount of user input required to complete the product evaluation form. Once the evaluation form has been completed, a reward 706 may be dispensed to the user through reward dispenser 708. The reward 706 may be, for example, cash, coupons, or tickets.

Product evaluation system 700 is an example of a product evaluation system which may be implemented in a store or other retail establishment to gather product evaluation information. Product evaluation system 700 is not meant to imply any architectural limitations with regard to the present invention.

Figure 8:
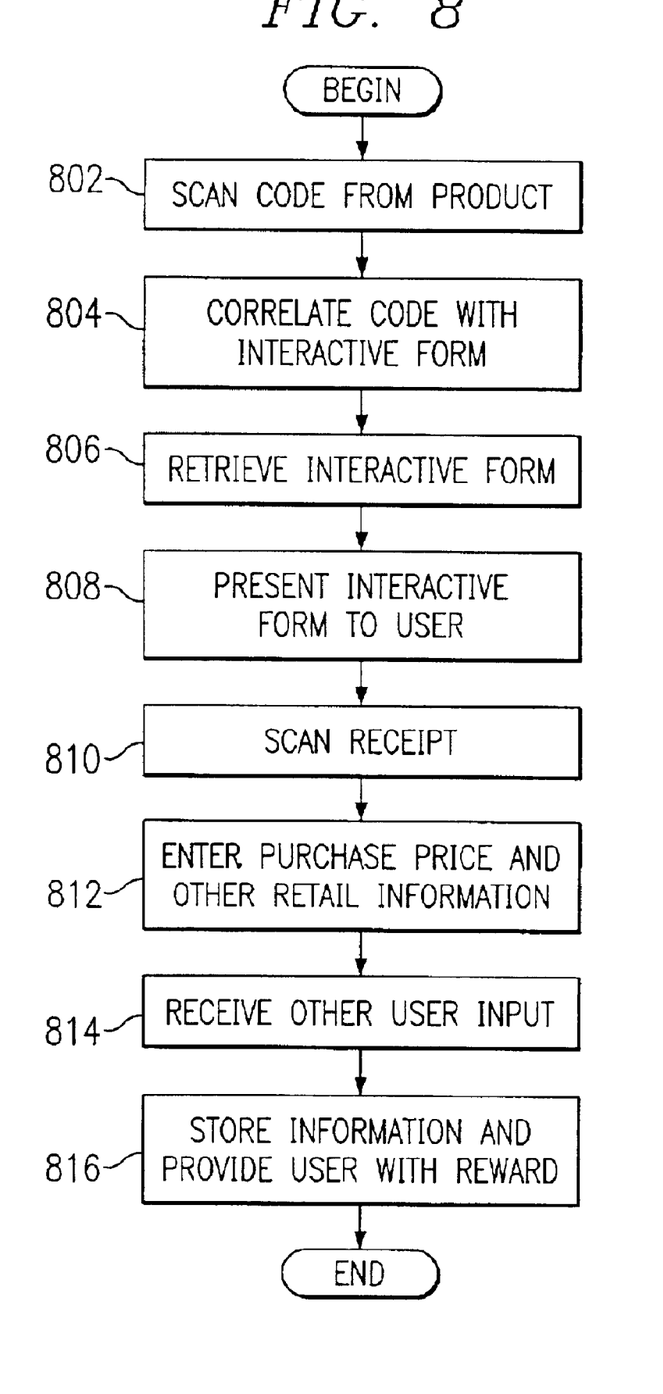
FIG. 8 depicts a process flow and program function for gathering product evaluation or other interactive information in accordance with the present invention.

With reference now to FIG. 8, a process flow and program function for gathering product evaluation or other interactive information is depicted in accordance with the present invention. The processes described in FIG. 8 may be implemented in, for example, product evaluation system 600 in FIG. 6. To begin, an optical code, such as a bar code, is scanned in from a product or object associated with a purchased service (step 802). The product associated with a service may be, for example, a ticket to an entertainment or sporting event. The scanned code is then correlated with an interactive form, such as a product evaluation form (step 804). For example, a database of URLs corresponding to product codes may be maintained. Thus, if a product's UPC is scanned, the system may find the corresponding URL or other location information from the database. The system then retrieves the interactive form using the location information associated with the scanned product (step 806).

Once the interactive form is retrieved, the form is presented to a user (step 808). The user may then optionally scan a code from a receipt associated with the product (step 810). The information encoded on the receipt may include the date purchased, location where purchased, price paid, and even possibly personal information about the purchaser, such as name, address, gender, and other demographic information. The system may then enter the information into appropriate portions of the interactive form (step 812). The system may then receive other user input (step 814). The user input information and scanned information are then stored for use by the information requester and the user is optionally provided with a reward (step 816). The reward may be a physical reward, such as dispensed cash or coupons, or may be in the form of, for example, an electronic coupon.

Thus, the present system provides a method that encourages consumers to register or provide product evaluations for purchased products by making the product evaluation or registration simpler and less time consuming.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. Although the depicted illustrations show the mechanism of the present invention embodied on a single server, this mechanism may be distributed through multiple data processing systems. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for evaluating a product, the method comprising:

reading a product identification token associated with the product wherein the product identification token identifies a location from which a product evaluation form may be retrieved;

retrieving the product evaluation form associated with the product using the product identification token;

presenting the product evaluation form to a user;

reading a receipt identification token on a receipt corresponding to the product, wherein the receipt identification token provides receipt purchase information; and entering the receipt purchase information into the product evaluation form, wherein the product evaluation form is an electronic form and entering the receipt purchase information further comprises automatically populating fields in the electronic form with the receipt purchase information.

2. The method as recited in claim 1, wherein reading the product identification token comprises optically scanning the product identification token.

3. The method as recited in claim 1, wherein the product identification token is a radio frequency identification tag and reading the product identification token comprises reading the radio frequency identification tag.

4. The method as recited in claim 1, further comprising:
receiving additional information entered by the user;
adding the additional information entered by the user to the product evaluation form; and
sending the product evaluation form to a requester, wherein the product evaluation form contains the receipt purchase information and the additional information entered by the user.

5. The method as recited in claim 1, further comprising:
receiving user input corresponding to requested information on the product evaluation form.

6. The method as recited in claim 1, wherein the product evaluation form is a product registration form.

7. The method as recited in claim 1, wherein retrieving the product evaluation form comprises retrieving the product evaluation form from a web site.

8. The method as recited in claim 1, further comprising:
providing a reward to the user upon completion of the product evaluation form.

9. The method as recited in claim 8, wherein the reward includes at least one of a coupon, a discount on a product, cash, frequent flyer mileage, credits towards goods, and credits towards services.

10. The method as recited in claim 1, wherein the product evaluation form includes a set of questions.

11. The method as recited in claim 1, wherein the receipt purchase information includes at least one of a purchase location, a purchase price, an identity of a store from which the product was purchased an identity of the purchaser, and demographic information about the purchaser.

12. The method as recited in claim 1, wherein the product identification token identifies the product and identifying a location from which a product evaluation form may be retrieved comprises retrieving the location from a database containing product identifications and associated locations from which a product evaluation form associated with the product may be retrieved.

13. The method as recited in claim 1, wherein the product identification token is a universal product code.

14. The method as recited in claim 1, wherein the product identification token is a bar code.

15. The method as recited in claim 1, wherein the product identification token associated with the product is located on the product.

16. A system for evaluating a product, the system comprising:
a reader which reads a product identification token associated with the product wherein the product identification token identifies a location from which a product evaluation form may be retrieved;
a retrieval unit which retrieves the product evaluation form associated with the product using the product identification token;
a presentation unit which presents the product evaluation form to a user;
wherein reader reads a receipt identification token on a receipt corresponding to the product, wherein the receipt identification token provides receipt purchase information; and
an entry unit which enters the receipt purchase information into the product evaluation form, wherein the product evaluation form is an electronic form and entering the receipt purchase information further comprises means for automatically populating fields in the electronic form with the receipt purchase information.

17. The system as recited in claim 16, further comprising:
a receiving unit which receives additional information entered by the user;
an adding unit which adds the additional information entered by the user to the product evaluation form; and
a transmitter which sends the product evaluation form to a requester, wherein the product evaluation form contains the receipt purchase information and the additional information entered by the user.

18. The system as recited in claim 16, further comprising:
a user input device which receives user input corresponding to requested information on the product evaluation form.

19. The system as recited in claim 16, wherein the product evaluation form is a web page retrieved by the system over the Internet.

20. The system as recited in claim 16, wherein the system is implemented as one of a desktop computer, a point of sale kiosk, a point of use kiosk, a personal digital assistant, a wireless telephone, and a laptop computer.

21. The system as recited in claim 16, wherein the product identification token identifies the product and further comprising:
a translation unit which associates a location from which the product evaluation form may be retrieved with the identified product.

22. The system as recited in claim 16, wherein the reader is an optical scanner.

23. The system as recited in claim 16, wherein the reader is a radio frequency identification tag reader.

24. The system as recited in claim 16, wherein the product identification token associated with the product is located on the product.

25. A computer program product in a computer readable media for use in a data processing system for evaluating a product, the computer program product comprising:
first instructions for reading a product identification token associated with the product wherein the product identification token identifies a location from which a product evaluation form may be retrieved;
second instructions for retrieving the product evaluation form associated with the product using the product identification token;
third instructions for presenting the product evaluation form to a user;
fourth instructions for reading a receipt identification token on a receipt corresponding to the product, wherein the receipt identification token provides receipt purchase information; and
fifth instructions for entering the receipt purchase information into the product evaluation form, wherein the product evaluation form is an electronic form and entering the receipt purchase information further comprises instructions for automatically populating fields in the electronic form with the receipt purchase information.

26. The computer program product as recited in claim 25, further comprising:

sixth instructions for receiving additional information entered by the user;

seventh instructions for adding the additional information entered by the user to the product evaluation form; and eighth instructions for sending the product evaluation form to a requester, wherein the product evaluation form contains the receipt purchase information and the addition information entered by the user.

27. The computer program product as recited in claim 25, further comprising:

sixth instructions for receiving user input corresponding to requested information on the product evaluation form.

28. The computer program product as recited in claim 25, further comprising:

sixth instructions for providing a reward to the user upon completion of the product evaluation form.

29. The computer program product as recited in claim 25, wherein reading a product identification token comprises optically scanning the product identification token.

30. The computer program product as recited in claim 25, wherein the product identification token is a radio frequency identification tag and reading the product identification token comprises reading the radio frequency identification tag.

31. The computer program product as recited in claim 25, wherein the product identification token associated with the product is located on the product.

* * * * *

UNITED STATES PATENT AND TRADEMARK OFFICE
CERTIFICATE OF CORRECTION

PATENT NO. : 6,938,002 B2 Page 1 of 1
DATED : August 30, 2005
INVENTOR(S) : Moskowitz et al.

It is certified that error appears in the above-identified patent and that said Letters Patent is hereby corrected as shown below:

<u>Column 9,</u>
Line 42, after "was purchased" insert -- , --.

<u>Column 10,</u>
Line 3, after "wherein" insert -- the --.

<u>Column 11,</u>
Line 13, before "information" delete "addition" and insert -- additional --.

Signed and Sealed this

Twenty-first Day of March, 2006

JON W. DUDAS
*Director of the United States Patent and Trademark Office*

Disclaimer

6,938,002 — Paul Andrew Moskowitz, Yorktown Heights, NY (US); Clifford A. Pickover, Yorktown Heights, NY (US); William Grey, Millwood, NY (US); and Stephen J. Boies, Mahopac, NY (US). SYSTEM AND METHOD FOR PRODUCT EVALUATION. Patent dated August 30, 2005. Disclaimer filed October 6, 2006, by the assignee, International Business Machines Corporation.

Hereby enters this disclaimer to all of the claims, of said patent.

*(Official Gazette, May 27, 2008)*